United States Patent

Abusleme et al.

Patent Number: 5,597,880
Date of Patent: Jan. 28, 1997

[54] ETHYLENE COPOLYMERS WITH TETRAFLUOROETHYLENE AND/OR CHLOROTRIFLUORETHYLENE HAVING IMPROVED MECHANICAL PROPERTIES AT HIGH TEMPERATURES

[75] Inventors: Julio A. Abusleme, Saronno; Pasqua Colaianna, Milano, both of Italy

[73] Assignee: Ausimont S.p.A., Italy

[21] Appl. No.: 582,648

[22] Filed: Jan. 4, 1996

[30] Foreign Application Priority Data

Jan. 4, 1995 [IT] Italy ................ MI95A0009

[51] Int. Cl.⁶ .................................. C08F 16/24
[52] U.S. Cl. .................................. 526/247
[58] Field of Search ........................... 526/247

[56] References Cited

U.S. PATENT DOCUMENTS

| | | |
|---|---|---|
| 3,624,250 | 11/1971 | Carlson . |
| 3,847,881 | 11/1974 | Mueller et al. . |
| 3,865,845 | 2/1975 | Resnick . |
| 4,399,264 | 8/1983 | Squire .................. 526/247 |
| 4,513,120 | 4/1985 | Nakagawa et al. . |
| 4,789,717 | 12/1988 | Giannetti et al. . |
| 4,827,024 | 5/1989 | Guglielmo et al. . |
| 4,864,006 | 9/1989 | Giannetti et al. . |
| 5,021,516 | 6/1991 | Wheland . |
| 5,182,342 | 1/1993 | Feiring et al. . |

FOREIGN PATENT DOCUMENTS

| | | | |
|---|---|---|---|
| 0625553 | 1/1990 | Australia .................. | 526/247 |
| 0076581 | 9/1982 | European Pat. Off. . | |
| 0080187 | 11/1982 | European Pat. Off. . | |
| 0073087 | 3/1983 | European Pat. Off. .................. | 526/247 |
| 0095077 | 5/1983 | European Pat. Off. . | |
| 0526216 | 12/1985 | European Pat. Off. . | |
| 0185242 | 12/1985 | European Pat. Off. . | |
| 0185241 | 6/1986 | European Pat. Off. .................. | 526/247 |
| 0460946 | 6/1991 | European Pat. Off. . | |
| 0612767 | 2/1994 | European Pat. Off. . | |
| 0625526 | 5/1994 | European Pat. Off. . | |
| 0633257 | 1/1995 | European Pat. Off. . | |
| 2822116 | 11/1978 | Germany .................. | 526/247 |
| 63-301268 | 12/1988 | Japan .................. | 526/247 |
| 1266119 | 10/1989 | Japan .................. | 526/247 |

OTHER PUBLICATIONS

*Trifluoromethyl Hypofluorite*, by K. B. Kellogg and George H. Cady, *J. Am. Chem. Soc.*, vol. 70, pp. 3986, (1948).

Primary Examiner—Joseph L. Schofer
Assistant Examiner—N. Sarofim
Attorney, Agent, or Firm—Bryan Cave LLP

[57] ABSTRACT

Copolymers comprising:
(A) from 30 to 70% by moles of ethylene;
(B) from 30 to 70% by moles of a fluorinated monomer selected from tetrafluoroethylene, chlorotrifluoroethylene, or their mixtures;
(C) from 0.1 to 10% by moles with respect to the total amount of monomers (A) and (B), of a fluorodioxol having the formula:

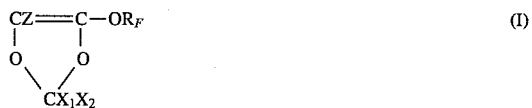

wherein $R_F$ is a perfluoroalkyl having from 1 to 5 carbon atoms; $X_1$ and $X_2$, equal to or different from each other, are —F or —CF₃; Z is selected from —F, —H, —Cl.

8 Claims, No Drawings

ETHYLENE COPOLYMERS WITH TETRAFLUOROETHYLENE AND/OR CHLOROTRIFLUORETHYLENE HAVING IMPROVED MECHANICAL PROPERTIES AT HIGH TEMPERATURES

The present invention relates to ethylene copolymers with tetrafluoroethylene and/or chlorotrifluoroethylene, having improved mechanical properties at high temperatures, combined with high resistance to thermal stress cracking.

Copolymers between ethylene and a fluorinated monomer selected from tetrafluoroethylene (TFE), chlorotrifluoroethylene (CTFE), or their mixtures, are known. Such products are endowed with excellent resistance properties to chemical agents and with good processability, as well as with very good electric and fire retardant properties, wherefore they can be used for the manufacture of valves, sleeves, pipes, electric cables insulators, plates, films, protective coatings, etc. to be employed in chemically aggressive environments. The melting temperature of such copolymers is very high (generally higher than 240° C.), wherefore they would potentially be suitable to uses at very high temperatures. Unfortunately, the maximum service temperature is strongly limited due to a considerable deterioration of the mechanical properties at temperatures much lower than the melting temperature. In particular, the material tends to fracture (brittle fracture) due to mechanical stresses, giving rise to the so called "thermal stress cracking", already at temperatures of 150°–160° C. and at temperatures gradually lower as the melt viscosity decreases, that is, as the molecular weight of the polymer decreases.

In order to try to avoid such a drawback, it is known to modify the ethylene copolymers with TFE and/or CTFE through the introduction of a fluorinated vinylic comonomer, such as for instance a (per)fluoroalkylvinylether wherein the alkyl has at least two carbon atoms, in particular the perfluoropropylvinylether, in amounts comprised between 0.1 and 10% by moles (see U.S. Pat. No. 3,624,250). Other possible comonomers, alternative to the previous ones, having for instance the formula R—CH=CH$_2$, wherein R is a perfluoroalkyl or a perfluoroalkoxy-perfluoroalkyl, are described in Patents EP 185,241, EP 185,242, U.S. Pat. No. 3,847,881, U.S. Pat. No. 4,513,129. Other possible modifying comonomers are the fluorodioxols of general formula:

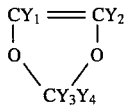

wherein: Y$_1$, Y$_2$ are —H, —F or —Cl: Y$_3$, Y$_4$ are —F or —CF$_3$ (see for instance Patents U.S. Pat. No. 3,865,845, EP 76,581, EP 80,187, EP 95,077, EP 73,087).

However, experiments carried out by the Applicant have shown that the copolymers modified with the comonomers of the prior art show, compared with the copolymers, a significant improvement of the mechanical properties at high temperatures and a higher resistance to the thermal stress cracking, only in case of high viscosity products, while the improvement with respect to the copolymers without the third comonomer results quite insignificant for the products having a low melt viscosity. This is a remarkable drawback since it is known that polymers having low viscosity (that is high Melt Flow Index) are preferrable for their better processability. A greater fluidity, in fact, allows to increase the productivity and to employ lower temperatures and processing pressures thus reducing thermochemical degradation phenomena, in particular dehydrohalogenation which, as known, leads to quick decay of the polymer properties and to evolvement of HF and/or HCl, highly corrosive.

The Applicant has now surprisingly found that the mechanical properties at high temperature, and in particular the elongation at break of the ethylene copolymers with TFE, CTFE, or their mixtures, are remarkably improved by introducing as comonomer a fluorodioxol as defined hereinunder, with consequent increase of the rating temperature. The fluorodioxols of the present invention unexpectedly determine, being the amount introduced equal, a more marked drop in the second melting temperature of the polymer in comparison with the known comonomers, and at the same time it surprisingly allows to obtain superior tensile properties at high temperatures. It is observed, combined with a higher elongation at break, a high resistance to brittle fracture both at low and high temperature, as shown by the elongation at break and creep measurements. The high elongation at break, as the melt viscosity decreases, decays much slower in comparison with the modified copolymers modified of the prior art. This allows the extension of the processability "window" towards the products having low viscosity. The high resistance to brittle fracture results clear both for the product as such, and in particular on samples submitted to thermal ageing at high temperature.

Without binding the present invention to theoretical models, it is deemed that the high modifying power of fluorodioxols of the present invention, higher than the modifying comonomers of the prior art, can be partly attributed to the strong tendency of such fluorodioxols to give rise to double bond sum in sin configuration.

Object of the present invention is therefore a copolymer comprising:
(a) from 30 to 70%, preferably from 40 to 60%, by moles of ethylene;
(b) from 30 to 70%, preferably from 40 to 60%, by moles of a fluorinated monomer selected from tetrafluoroethylene, chlorotrifluoroethylene, or their mixtures;
(c) from 0.1 to 10%, preferably from 0.3 to 5%, even more preferably from 0.5 to 2.5%, by moles with respect to the total amount of monomers (a) and (b), of a fluorodioxol having th formula:

wherein R$_F$ is a perfluoroalkyl having from 1 to 5 carbon atoms; X$_1$ and X$_2$, equal to or different from each other, are —F or —CF$_3$; Z is selected from —F, —H, —Cl.

Preferably, in the formula (I) X$_1$, X$_2$ and Z are —F, R$_f$ and preferably —CF$_3$, —C$_2$F$_5$, or —C$_3$F$_7$. Particularly preferred are the fluorodioxols of formula (I) wherein R$_f$ is —CF$_3$ or —C$_2$F$_5$.

The fluorodioxols of formula (I) are described in European patent application No. 94109782.6 in the name of the Applicant, the content of which is herein incorporated by reference. In case Z is —F, they can be prepared by means of the following process, comprising
(a) to react at a temperature from −140° to +60° C. (preferably from 110° to −20° C.) a dioxol of formula:

wherein X$_1$ and X$_2$ have the meaning indicated above, with a fluoroxy-compound of formula R$_f$OF, wherein R$_f$ has the meaning indicated above, thus obtaining a dioxolane of formula:

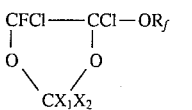  (III)

(b) to dehalogenate the dioxolane (III) according to known techniques, by reacting it with a metal in an aprotic dipolar solvent.

The dioxols of formula (II) are known compounds; they can be prepared for instance according to what described in EP Patent application 460,946. Also the fluoroxycompounds $R_f$—OF are known products. $CF_3OF$ can be prepared, for instance, according to what described by G. H. Cady and K. B. Kellogg in J. Am. Chem. Soc. 70, 3986, 1948, the higher homologues by the process described in U.S. Pat. No. 4,827,024.

An alternative process to the former one for preparing fluorodioxols of formula (I) wherein Z is —F, described too in the European patent applictaion No. 94109782.6, comprises:

(a) to react, at a temperature comprised from −140° to +60° C. (preferably from −110° to −20° C.), an olefin of formula:

  (IV)

wherein $R_f$ is defined as above, with a bis-fluoroxy-compound having the formula:

  (V), thus obtaining the dioxolane of formula (III);

(b) to dehalogenate the dioxolane (III) as described above.

The olefin (IV) can be obtained by reacting $CCl_2$=$CCl_2$ with $R_fOF$ so as to obtain the compound $R_f$—$OCCl_2$—$CFCl_2$, which, by dechlorination reaction with zinc in powder in organic solvent, supplies the olefin (IV).

Another process for preparing fluorodioxols of formula (I) when Z is —F, described as well in European patent application No. 94109782.6, comprises reacting at a temperature from 50° to 150° C. a dioxolane of formula:

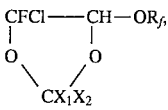  (VI)

optionally in admixture with a dioxolane of formula:

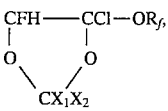  (VII)

wherein $R_f$ is defined as above, with KOH at the solid state, with consequent dehydrochlorination and formulation of fluorodioxol.

The dioxolane (VI) can be obtained by reacting $R_fOF$ with trichloroethylene so a to obtain the $R_f$O—CHCl—$CFCl_2$ compound, which is then dechlorinated with zinc in powder in organic solution. The olefin of formula $R_f$—OCH=CFCl is thus obtained, which is finally reacted with $CX_1X_2(OF)_2$, as described above for the olefin (IV), by obtaining the dioxolane (VI).

The dioxolane (VII), in admixture with the dioxolane (VI), can be prepared as follows. The olefin CHCl=CHCl is reacted with $CX_1X_2(OF)_2$ by obtaining the dioxolane having the formula:

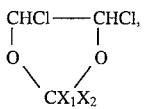  (VIII)

which, by dehydrohalogenation with solid KOH, gives the dioxol of formula:

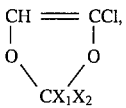  (IX)

This last is at least reacted with $R_fOF$, thus obtaining a mixture of the dioxolanes (VI) and (VII).

The synthesis of fluorodioxols (I) can utilize, similarly to the processes already shown, the dichloroethylene or trichloroethylene, which are reacted with hypofluorites of formula:

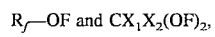

so as to obtain, by alternating reactions of dechlorination and dehydrochlorination, the various reaction intermediates described above.

Similarly to what described above for Z=—F, when Z is —Cl or —H, the fluorodioxols of formula (I) can be prepared according to the following method. 1,1-dichloroethylene $CH_2$=—$CCl_2$ is reacted with hypochlorite $R_fOCl$ and the reaction product is dehydrochlorinated as described above, so that the olefin of formula $R_f$—OCCl=CHCl is obtained.

This last is reacted with $CX_1X_2(OF)_2$, as described above for the olefin (IV), obtaining the dioxolane having the formula:

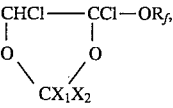  (X)

The dioxolane (X) can be dehydrochlorinated with solid KOH by supplying the fluorodioxol (I) with Z=—Cl, or it can be dechlorinated with Zn in powder in organic solvent to give the fluorodioxol (I) with X=—H.

The copolymers object of the present invention can be prepared according to known techniques, by copolymerization of the corresponding monomers, in suspension in organic medium or in aqueous emulsion, in the presence of a suitable radicalic initiator, at a temperature comprised from −60° tto +150° C., preferably from −20° to +100° C. The reaction pressure is generally comprised from 0.5 to 100 bar, preferably from 5 to 40 bar.

Among the various radicalic initiators, can in particular be employed:

(i) bis-acylperoxides of formula $(R_f$—CO—$O)_2$, wherein $R_f$ is a (per)haloalkyl $C_1$-$C_{10}$ (see for instance EP patents 1-85,242 and U.S. Pat. No. 4,513,129), or a perfluoropolyoxyalkylenic group (see for instance patents EP-185,242 and U.S. Pat. No. 5,02-1,516); among them, bis-trichloroacetylperoxide and bis-dichloro-fluoroacetylperoxide are particularly preferred.

(ii) dialkylperoxides of formula $(R_f$—$O)_2$ wherein $R_f$ is a perhaloalkyl $C_1$—$C_{10}$; the diterbutylperoxide (DTBP) is particularly preferred;

(iii) the inorganic peroxides soluble in water, such as ammonium or alkaline metals persulphates or perphosphates; the ammonium or potassium persulphate are particularly preferred.

(iv) dialkylperoxydicarbonates, wherein the alkyl has from 1 to 8 carbon atoms, such as for instance di-n-propyl-peroxydicarbonate and di-isopropyl-peroxydicarbonate (see EP patent 526,216).

(v) organic or inorganic redox systems, such as ammonium persulphate/sodium sulphite, hydrogen peroxide/amino-iminomethansulphinic acid, etc.

In case of the copolymerization in suspension, the reaction medium is formed by an organic phase, to which water is usually added in order to favour the heat dispersion developing during the reaction. The organic phase can be formed by the monomers themselves, without addition of solvents, or by the monomers dissolved in a suitable organic solvent. As organic solvents chlorofluorocarbons, such as $CCl_2F_2$ (CFC-12), $CCl_3F$ (CFC-11), $CCl_2FCClF_2$ (CFC-113), $CClF_2CClF_2$ (CFC-114), etc., are traditionally employed as organic solvents. Since such products have a depleting potential on the ozone present in the stratosphere, alternative products have lately been proposed, such as compounds containing only carbon, fluorine, hydrogen, and optionally oxygen, described in U.S. Pat. No. 5,182,342. A valid alternative is given by branched chain hydrocarbons described in EP patent application EP-A-612,767, having from 6 to 25 carbon atoms and a ratio between methylic groups and number of carbon atoms higher than 0.5, such as for instance 2,3-dimethylbutane, 2,3-dimethylpentane, 2,2,4-trimethylpentane, 2,2,4,6,6-pentamethylheptane, 2,2,4,4,6-pentamethylheptane, etc. or their mixtures.

In case of (co)polymerization in aqueous emulsion, the presence of a suitable surfactant is needed. The most commonly surfactants used are those fluorinated having the formula:

$$R_fX^-M^+$$

wherein $R_f$ is a (per)fluoroalkylic chain $C_5$-$C_{16}$ or a (per)fluoropolyoxyalkylenic chain, $X^-$ is —COO$^-$ or —SO$_3^-$, $M^+$ is selected from: $H^+$, $NH_4^+$, an alkaline metal ion. Among them it can be mentioned: ammonium and/or sodium perfluoro-octanoate, (per)fluoropolyoxyalkylenes terminated with one or more carboxylic groups, etc.

The process object of the present invention can be advantageously carried out in the presence of perfluoropolyoxyalkylenes emulsions or microemulsions, according to what described in U.S. Pat. Nos. 4,789,717 and 4,864,006, or also of fluoropolyoxyalkylenes microemulsions having hydrogenated end groups and/or hydrogenated repetitive units, optionally in admixture with an hydrocarbon, according to what described in EP patent application 625,526 and in EP 95 117052.1 in the name of the Applicant.

In order to control the molecular weight of the final product, to the reaction system can be added suitable chain transfer agents, such as: ketones, esters, ethers or aliphatic alcohols having from 3 to 10 carbon atoms; halogenated hydrocarbons or hydrocarbons having from 1 to 12 carbon atoms, preferably from 1 to 6; bis(alkyl)carbonates wherein the alkyl has from 1 to 5 carbon atoms; etc. Among them, chloroform and methylcyclopentane are particularly preferred. The transfer agent is sent into the reactor at the beginning of the reaction, or continuously or in discrete amounts during the polymerization. The amount of the chain transfer agent utilized can range within rather wide limits, depending on the type of the monomers employed, of the reaction temperature and of the molecular weight desired. Generally, such an amount ranges from 0.01 to 30% by weight, preferably from 0.05 to 10% by weight, with respect to the total amount of monomers charged into the reactor.

Some examples of the present invention are reported hereinafter, whose purpose is merely illustrative and not limitative of the invention itself.

EXAMPLE 1

In a 30 gallons Pfaudler type enamelled autoclave, equipped with stirrer working at 350 rpm, 45.6 l of demineralized water were loaded. The autoclave was pressurized with nitrogen and subsequently evacuated. 13.6 kg of methanol, 100 ml of chloroform, 22.7 kg of chlorotrifluoroethylene (CTFE) and 3.45 kg of 2,2,4-trifluoro-5-trifluoromethoxy-1,3-dioxol (TTD), having the formula:

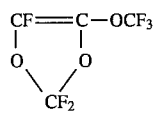

are then introduced. The reactor was brought to 5° C. and then pressurized with ethylene until an internal pressure of 12.7 absolute bar was obtained. The radicalic initiator, constituted by a solution, kept at −17° C., of trichloroacetylperoxide (TCAP) in CFC-113, having concentration equal to 0.1 g/ml, was gradually introduced into the autoclave. 67.2 g of TCAP were totally fed. The working pressure was kept approximately constant during the reaction by continuously feeding ethylene. After 165 min, the reaction was stopped. 12.6 kg of dry polymer were obtained.

The product was characterized as reported in Table 1. The monomeric composition was determined by carbon elementary analysis and FT-IR spectroscopy, the second melting temperature ($T_{2m}$) by scanning differential calorimetry (DSC), the Melt Flow Index (MFI) according to ASTM D 3275-89.

Samples for compression molding were drawn on which the mechanical properties were determined at 23° C., 175° C. and 200° C. (according to ASTM D 1708 standard, with stretching rate of 50 mm/min). The break creeps measurements were carried out, according to ASTM D 2290 standard, on samples molded by compression and pre-treated at 165° C. for 72 hours by tensile stress at 165° C. with a 1.75 MPa strength. The time and the eleongation were registered when the sample fractured. For Ex. 1 no fracture of the sample was noticed, even though the maximum elongation, allowed by the measurement device, was reached.

EXAMPLE 2

Example 1 was repeated under the same conditions, except that 150 ml of chloroform were added to the reaction medium. The reaction was stopped after 168 min. 63.5 g of TCAP were totally fed. 13.7 kg of dry polymer were obtained. The product was characterized as reported in Table 1.

EXAMPLE 3

Example 1 was repeated under the same conditions, except that 178 ml of chloroform wer added to the reaction medium. The reaction was stopped after 163 min. 61.2 g of TCAP were totally fed. 13.4 kg of dry polymer were obtained. The product was characterized as reported in Table 1.

EXAMPLE 4 (comparative)

In a 30 gallons Pfaudler type enamelled autoclave, equipped with stirrer working at 350 rpm, 45.6 l of demineralized water were loaded. The autoclave was pressurized with nitrogen and subsequently evacuated. 13.6 kg of methanol, 100 ml of chloroform, 4.0 kg of perfluoropropylvinylether (PPVE) and 22.7 kg of chlorotrifluoroethylene (CTFE) were then introduced. The reactor was brought to 5° C. and then pressurized with ethylene until an internal pressure of 13.4 absolute bar was obtained. The radicalic initiator, formed by a solution, kept at −17° C., of trichloroacetylperoxide (TCAP) in CFC-113, having concentration equal to 0.09 g/ml, was then gradually introduced into the autoclave.
59.6 g of TCAP were totally fed. The working pressure was kept approximately constant during the reaction by continuously feeding ethylene. After 235 min, the reaction was stopped. 10.4 kg of dry polymer were obtained.
The product was characterized as reported in Table 1.

EXAMPLE 5 (comparative)

In a 30 gallons Pfaudler type enamelled autoclave, equipped with stirrer working at 350 rpm, 45.6 l of demineralized water were loaded. The autoclave was pressurized with nitrogen and subsequently evacuated. 13.6 kg of methanol, 150 ml of chloroform, 3.4 kg of perfluoropropylvinylether (PPVE) and 22.7 kg of chlorotrifluoroethylene (CTFE) were then introduced. The reactor was brought to 5° C. and then pressurized with ethylene until an internal pressure of 12.7 absolute bar was obtained. The radicalic initiator, formed by a solution, kept at −17° C., of trichloroacetylperoxide (TCAP) in CFC-113, having concentration equal to 0.1 g/ml, was then gradually introduced into the autoclave.
77.4 g of TCAP were totally fed. The working pressure was kept approximately constant during the reaction by continuously feeding ethylene. After 254 min, the reaction was stopped. 12.7 kg of dry polymer were obtained. The product was characterized as reported in Table 1.

EXAMPLE 6 (comparative)

Example 5 was repeated under the same conditions, except that 178 ml of chloroform were added to the reaction medium as chain transfer agent. The reaction was stopped after 225 min. 71.5 g of TCAP were totally fed. 14.0 kg of dry polymer were obtained. The product was characterized as reported in Table 1.

EXAMPLE 7 (comparative)

In a 30 gallons Pfaudler type enamelled autoclave, equipped with stirrer working at 350 rpm, 45.6 l of demineralized water were loaded. The autoclave was pressurized with nitrogen and subsequently evacuated. 13.6 kg of methanol, 90 ml of chloroform and 22.7 kg of chlorotrifluoroethylene (CTFE) were then introduced. The reactor was brought to 5° C. and then pressurized with ethylene until an internal pressure of 12.7 absolute bar was obtained. The radicalic initiator, formed by a solution, kept at −17° C., of trichloroacetylperoxide (TCAP) in CFC-113, having concentration equal to 0.12 g/ml, was then gradually introduced into the autoclave. 47.4 g of TCAP were totally fed. The working pressure was kept approximately constant during the reaction by continuously feeding ethylene. After 230 min, the reaction was stopped. 17.6 kg of dry polymer were obtained. The product was characterized as reported in Table 1.

TABLE 1

| COPOLYMER COMPOSITION (% by mole) | | 1<br>CTFE 49.0<br>ET 49.7<br>TTD 1.3 | 2<br>CTFE 48.8<br>ET 49.8<br>TTD 1.4 | 3<br>CTFE 49.0<br>ET 49.8<br>TTD 1.2 | 4(*)<br>CTFE 48.9<br>ET 50.0<br>PPVE 1.1 | 5(*)<br>CTFE 49.1<br>ET 49.7<br>PPVE 1.2 | 6(*)<br>CTFE 48.9<br>ET 50.0<br>PPVE 1.1 | 7(*)<br>CTFE 50.9<br>ET 49.1 |
|---|---|---|---|---|---|---|---|---|
| MFI (g/10') | | 2.7 | 7.1 | 11.2 | 2.4 | 5.5 | 10.8 | 1.8 |
| $T_{2m}$ (°C.) | | 229.6 | 229.5 | 230.6 | 234.6 | 236.3 | 237.0 | 243.9 |
| MODULUS (MPa) | 23° C. | 1470 | 1478 | 1501 | 1470 | 1535 | 1546 | 1580 |
|  | 175° C. | 23 | 22 | 26 | 27 | 32 | 30 | 46 |
|  | 200° C. | 18 | 22 | 24 | 18 | 20 | 22 | 34 |
| YIELD STRENGTH (MPa) | 23° C. | 33.7 | 34.4 | 34.4 | 32.8 | 33.4 | 33.0 | 31.5 |
|  | 175° C. | 2.1 | 2.1 | 2.2 | 2.2 | 2.2 | 2.2 | 2.7 |
|  | 200° C. | 1.5 | 1.5 | 1.5 | 1.6 | 1.6 | 1.5 | 2.0 |
| YIELD ELONGATION (%) | 23° C. | 5.1 | 4.7 | 4.7 | 4.4 | 4.4 | 4.6 | 4.8 |
|  | 175° C. | 43.6 | 42.5 | 38.8 | 39.6 | 36.3 | 33.9 | 30.0 |
|  | 200° C. | 45.1 | 42.2 | 41.0 | 41.0 | 29.0 | 20.0 | 23.5 |
| STRESS AT BREAK (MPa) | 23° C. | 53.0 | 53.0 | 51.0 | 57.0 | 56.0 | 56.0 | 59.0 |
|  | 175° C. | 2.9 | 2.2 | 2.1 | 2.6 | 2.2 | 1.8 | 2.0 |
|  | 200° C. | 1.6 | 1.2 | 1.3 | 1.4 | 1.5 | 1.1 | 1.7 |
| ELONGATION AT BREAK (%) | 23° C. | 264 | 298 | 298 | 281 | 299 | 313 | 267 |
|  | 175° C. | 578 | 405 | 331 | 717 | 520 | 272 | 156 |
|  | 200° C. | 393 | 132 | 99 | 148 | 36 | 25 | 26 |
| CREEP | at 165° C. | | | | | | | |
| time (min) | | 10080(§) | — | — | 52 | — | — | 26 |
| elongation (%) | | 200 | | | 15.1 | | | 6.25 |

(*)comparative
(§)no breaking

We claim:
1. Copolymers comprising
   (a) from 30 to 70% by moles of ethylene;
   (b) from 30 to 70% by moles of a fluorinated monomer selected from tetrafluoroethylene, chlorotrifluoroethylene, or their mixtures;
   (c) from 0.1 to 10% by moles with respect to the total amount of monomers (A) and (B), of a fluorodioxol having the formula:

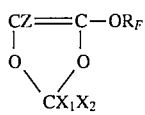

(I)

wherein $R_F$ is a perfluoroalkyl having from 1 to 5 carbon atoms; $X_1$ and $X_2$, equal to or different from each other, are —F or —$CF_3$, Z is selected from —F, —H, —Cl.

2. Copolymers according to claim 1, wherein the monomers (a) and (b)=are each present in an amount comprised from 40 to 60% by moles.

3. Copolymers according to claim 1, wherein the monomer (c) is present in an amount comprised from 0.3 to 5% by moles with respect to the total amount of monomers (a) and (b).

4. Copolymers according to claim 3, wherein the monomer (c) is present in an amount comprised between 0.5 and 2.5% by moles with respect to the total amount of monomers (a) and (b).

5. Copolymers according to claim 1, wherein in the formula (I) $X_1$ and $X_2$ are both —F.

6. Copolymers according to claim 1, wherein in the formula (I) Z is —F.

7. Copolymers according to anyone of the previous claims wherein in the formula (I) $R_f$ is selected from —$CF_3$, —$CF_5$ and —$C_3F_7$.

8. Copolymers according to claim 1, wherein in the formula (I) $X_1$, $X_2$ and Z are F and $R_f$ is $CF_3$.

* * * * *